United States Patent [19]
Morisaki

[11] Patent Number: 5,711,928
[45] Date of Patent: Jan. 27, 1998

[54] PROCESS FOR PRODUCING HIGH-PURITY SULFURIC ACID

[75] Inventor: Akira Morisaki, Sodegaura, Japan

[73] Assignee: Sumitomo Chemical Company, Limited, Osaka, Japan

[21] Appl. No.: 776,914

[22] PCT Filed: Jun. 17, 1996

[86] PCT No.: PCT/JP96/01649
§ 371 Date: Feb. 13, 1997
§ 102(e) Date: Feb. 13, 1997

[87] PCT Pub. No.: WO97/00228
PCT Pub. Date: Jan. 3, 1997

[30] Foreign Application Priority Data

Jun. 15, 1995 [JP] Japan ..................... 7-149033

[51] Int. Cl.$^6$ ................ C01B 17/74; C01B 17/90
[52] U.S. Cl. ................ 423/522; 423/531; 422/161
[58] Field of Search ............... 423/522, 531, 423/533; 422/160, 161

[56] References Cited

U.S. PATENT DOCUMENTS

| | | | |
|---|---|---|---|
| 2,730,431 | 1/1956 | Haltmeier | 423/529 |
| 5,164,049 | 11/1992 | Clark et al. | 423/531 |
| 5,194,239 | 3/1993 | Masseling et al. | 423/529 |
| 5,198,206 | 3/1993 | Schoubye | 423/522 |

FOREIGN PATENT DOCUMENTS

| | | | |
|---|---|---|---|
| 59042 | 8/1973 | Australia | 423/531 |
| 577324 | 6/1959 | Canada | 423/531 |
| 3315263 | 10/1984 | Germany | 423/529 |
| 56-022608 | 3/1981 | Japan . | |
| 3-504958 | 10/1991 | Japan . | |

*Primary Examiner*—Gary P. Straub
*Attorney, Agent, or Firm*—Cushman, Darby & Cushman IP Group of Pillsbury, Madison & Sutro LLP

[57] ABSTRACT

A process for producing high-purity sulfuric acid, comprising: an absorption step of causing water to contact sulfuric acid anhydride in a gaseous state which may possibly contain sulfurous acid gas as an impurity, so as to cause the sulfuric acid anhydride to be absorbed into the water, thereby to provide sulfuric acid; a stripping step of subjecting the sulfuric acid to stripping by use of air, thereby to separate and remove the sulfurous acid gas in the sulfuric acid; and a transport step of subjecting at least a portion of the sulfuric acid to liquid transportation by means of a circulating pump; wherein the temperature of the liquid at the inlet port of the circulating pump is 0°–30° C. When the above process is used, it is possible to produce high-purity sulfuric acid from which metal constituents and sulfurous acid gas as impurities have highly been removed.

6 Claims, 3 Drawing Sheets

PROCESS FOR PRODUCING HIGH-PURITY SULFURIC ACID

This application is the national phase of international application PCT/JP96/01649, filed Jun. 17, 1996 which designated the U.S.

TECHNICAL FIELD

The present invention relates to a process for producing high-purity sulfuric acid which is suitably usable for a semiconductor device-fabricating process. More specifically, the present invention relates to a process for producing high-purity sulfuric acid, from which metal constituents and sulfurous acid gas (sulfur dioxide, $SO_2$) as impurities have highly been removed.

BACKGROUND ART

In the processes for fabricating semiconductor devices, inorganic chemicals such as alkalies and acids, and organic solvents such as alcohols and ketones are used for the purpose of etching, cleaning or washing, peeling operations, etc., for wafers (inclusive of various states of wafers appearing in the course of processing thereof into devices; in the same meaning in the description appearing hereinafter). As the large-scale integrated circuits (LSIs) to be fabricated through these semiconductor device-fabricating processes are caused to have a higher density and a larger scale of integration, various kinds of contaminations come to affect the yield, quality and reliability of the resultant products of the semiconductor devices. Accordingly, the chemicals per se to be used in the semiconductor-fabricating processes have also been required to contain smaller amounts of impurities and to have a purity as high as possible.

In general, the semiconductor-fabricating processes include many element techniques (such as oxidation, film growth, and etching), and they also require cleaning (or washing) operations for the purpose of linking or connecting these element techniques, i.e., operations for removing various kinds of contaminations produced by the processing based on the respective elemental techniques, by use of physical and/or chemical means. Accordingly, in the semiconductor-fabricating processes, "cleaning" is a most fundamental and essential technique.

In the semiconductor-fabricating processes, sulfuric acid is sometimes used as a component constituting a cleaning liquid for cleaning silicon wafers, e.g., for the purpose of resist stripping, or for the purpose of removing organic contamination or a (minor) metal contamination by oxidation, etc. However, when a metal constituent as an impurity is present in the above sulfuric acid, there can be posed some problems such that the electric characteristics of the above silicon wafer are deteriorated, and the performances of the resultant device are deteriorated. Further, when sulfurous acid gas as an impurity is present in such sulfuric acid, problems similar to those as described above can be posed. Accordingly, the sulfuric acid to be used in the semiconductor-fabricating process is required to have a low metal constituent concentration as well as a low sulfurous acid gas concentration. However, a process for producing of such high-purity sulfuric acid which can provide a product satisfying the above-mentioned requirements and can also be conducted efficiently from an industrial point of view has never been found yet.

An object of the present invention is to provide a process for producing high-purity sulfuric acid from which metal constituents and sulfurous acid gas as impurities have highly been removed.

DISCLOSURE OF INVENTION

As a result of earnest study, the present inventor has found that the combination of a specific liquid temperature at the inlet port of a circulating pump and the liquid transport conducted by such a circulating pump may effectively suppress an increase in the level of metal impurities contained in the resultant sulfuric acid, and that such a combination is extremely effective in achieving the above object.

The process for producing high-purity sulfuric acid according to the present invention is based on the above discovery and comprises:

an absorption step of causing water to contact sulfuric acid anhydride in a gaseous state which may possibly contain sulfurous acid gas as an impurity, so as to cause the sulfuric acid anhydride to be absorbed into the water, thereby to provide sulfuric acid;

a stripping step of subjecting the sulfuric acid to stripping by use of air, thereby to separate and remove the sulfurous acid gas in the sulfuric acid; and a transport step of subjecting at least a portion of the sulfuric acid to liquid transportation by means of a circulating pump;

wherein the temperature of the liquid at the inlet port of the circulating pump is 0°–30° C.

BEST MODE FOR CARRYING OUT THE INVENTION

Hereinbelow, the present invention will be described in detail with reference to the accompanying drawings, as desired.

(Process for Producing High-Purity Sulfuric Acid)

Figure 1:
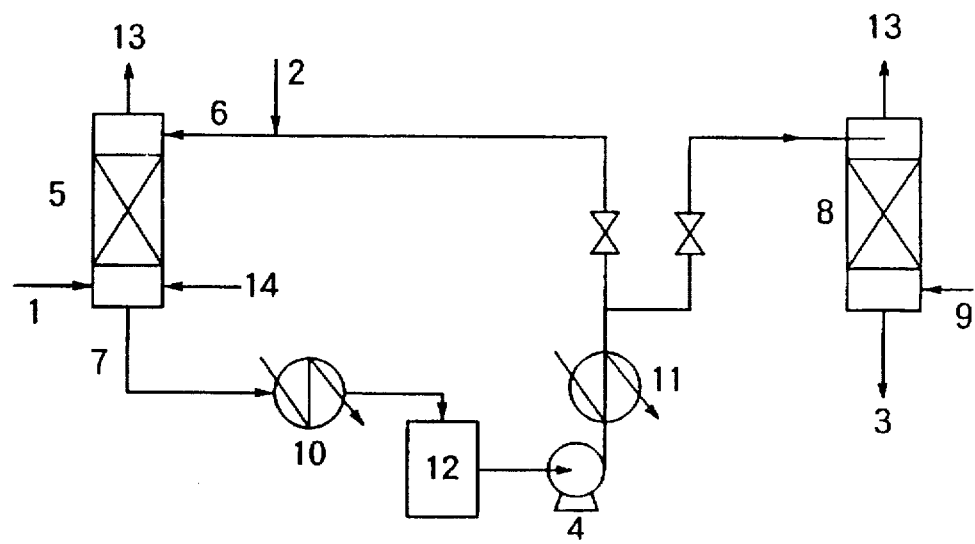
FIG. 1 is a block-type flow chart schematically showing the structure of an example of the apparatus for producing high-purity sulfuric acid, which is usable for conducting the production process according to the present invention.

FIG. 1 is a flow chart schematically showing the structure of an example of the apparatus for producing high-purity sulfuric acid, which is usable for conducting the production process according to the present invention. In this FIG. 1, the reference numerals show the following items, respectively. 1: sulfuric acid anhydride in a gaseous state, 2: water, 3: high-purity sulfuric acid, 4: circulating pump, 5: absorption tower, 6: aqueous sulfuric acid, 7: crude sulfuric acid, 8: stripping tower, 9: air, 10: cooler, 11: heat exchanger, 12: circulating tank, 13: vent, and 14: air.

Referring to FIG. 1, in such an embodiment, the high-purity sulfuric acid (3) is produced from the sulfuric acid anhydride (1) in a gaseous state which can contain sulfurous acid gas as an impurity, and water (2). This production process includes the following steps (a) to (c). In the present invention, the temperature of the liquid at the inlet port of the following circulating pump (4) is 0°–30° C. On the other hand, the temperature of the liquid to be supplied to the following stripping step may preferably be 60°–180° C.

(a) Absorption step: a step wherein, in absorption tower (5), the aqueous sulfuric acid (6) diluted with water is caused to contact the sulfuric acid anhydride (1) in a gaseous state so that the sulfuric acid anhydride (1) in a gaseous state is caused to be absorbed into the aqueous sulfuric acid, thereby to obtain the crude sulfuric acid (7) which can contain sulfurous acid gas as an impurity;

(b): Transport step: a step wherein at least a portion of the above-mentioned crude sulfuric acid (7) is supplied to the following stripping step, and wherein liquid is transported by means of the circulating pump (4); and (c): Stripping step: a step wherein, in stripping tower (8), the crude sulfuric acid (7) which has been supplied from the above-mentioned transport step is subjected to stripping by use of air (9) so that the sulfurous acid gas contained in the crude sulfuric acid is separated from the sulfuric acid to be removed, thereby to obtain the high-purity sulfuric acid (3).

(Absorption Process)

The absorption process in the present invention is a step wherein in absorption tower (5), the aqueous sulfuric acid (6) diluted with water is caused to contact the sulfuric acid anhydride (1) in a gaseous state so that the sulfuric acid anhydride (1) in a gaseous state is caused to be absorbed into the aqueous sulfuric acid, thereby to obtain the crude sulfuric acid (7) which can contain sulfurous acid gas as an impurity.

The above-mentioned sulfuric acid anhydride ($SO_3$) in a gaseous state as a raw material is not particularly limited, but may preferably be one having a sulfurous acid gas ($SO_2$) content of about 100 wt. ppm or below (more preferably, about 10 wt. ppm or below) in view of easiness in the removal of an impurity. A commercially available product can generally be used as such sulfuric acid anhydride, but the commercially available sulfuric acid anhydride usually contains sulfurous acid gas in an amount of about 10–100 wt. ppm.

The water (2) to be used as a raw material together with the above-mentioned sulfuric acid anhydride ($SO_3$) may preferably be so-called ultra pure water. The ultra pure water to be preferably usable in the present invention is a product which has a resistivity of 18 MΩ·cm or more, a number of particulates of 10 particles/ml or less, a chlorine concentration of 0 ppm, and a number of bacteria of 10 colonies/ml or less. With respect to the details of such ultra pure water, for example, Yasutaka BAN, "Silicon LSI and Chemistry", page 101 (1993), published by Dainippon Tosho may be referred to.

As the above absorption tower (5) for causing the above-mentioned sulfuric acid anhydride to contact the water, it is possible to use an usual item such as packed tower. It is preferred that the above absorption tower is filled with a filling material such as Raschig ring.

In this absorption step, for example, it is possible that the sulfuric acid anhydride in a gaseous state is supplied from a lower portion of the absorption tower (packed tower), and the ultra pure water is supplied from an upper porion of the absorption tower, and both of these materials are caused to contact each other in the absorption tower. Herein, for the purpose of removing the sulfurous acid gas, it is also possible to supply air from a lower portion of the absorption tower. In addition, it is also possible to supply sulfuric acid, which has been recycled from a transport step as described hereinbelow, to the absorption tower used in this absorption step so that the sulfuric acid and the above ultra pure water are put together, and then the resultant product is caused to contact the sulfuric acid anhydride in a gaseous state.

(Transport Step)

The transport step in the present invention is a step for supplying at least a part of the crude sulfuric acid (7) obtained in the above-mentioned absorption step to a stripping step as described below. In this step, liquid transportation is conducted by means of a circulating pump (4). In the present invention, the temperature of the liquid at the inlet port of the circulating pump (4) is required to be 0°–30° C., but may preferably be 20°–30° C.

If the temperature of the sulfuric acid at the inlet port of the circulating pump is below 0° C., the viscosity of the liquid to be transported is increased so as to lower the efficiency of the transportation, and further, the removal of the sulfurous acid gas becomes difficult. On the other hand, when the above temperature exceeds 30° C., it is possible that a metal constituent is dissolved from the metal constituting the circulating pump into the sulfuric acid, and the concentration of the metal constituent in the (high-purity) sulfuric acid as a resultant product can be increased.

The method of controlling the temperature of the liquid at the inlet port of the circulating pump (4) within the above-mentioned range is not particularly limited, but, for example, it is possible to adopt a method wherein a cooler is disposed at the inlet port of the circulating pump so as to cool the sulfuric acid. Further, the method of measuring the temperature of the liquid at the inlet port of the circulating pump (4) is not particularly limited, but it is preferred to use a thermocouple-type thermometer using a well comprising Teflon (tetrafluoroethylene) or quartz glass, etc, in view of the prevention of the metal contamination.

Figure 2:
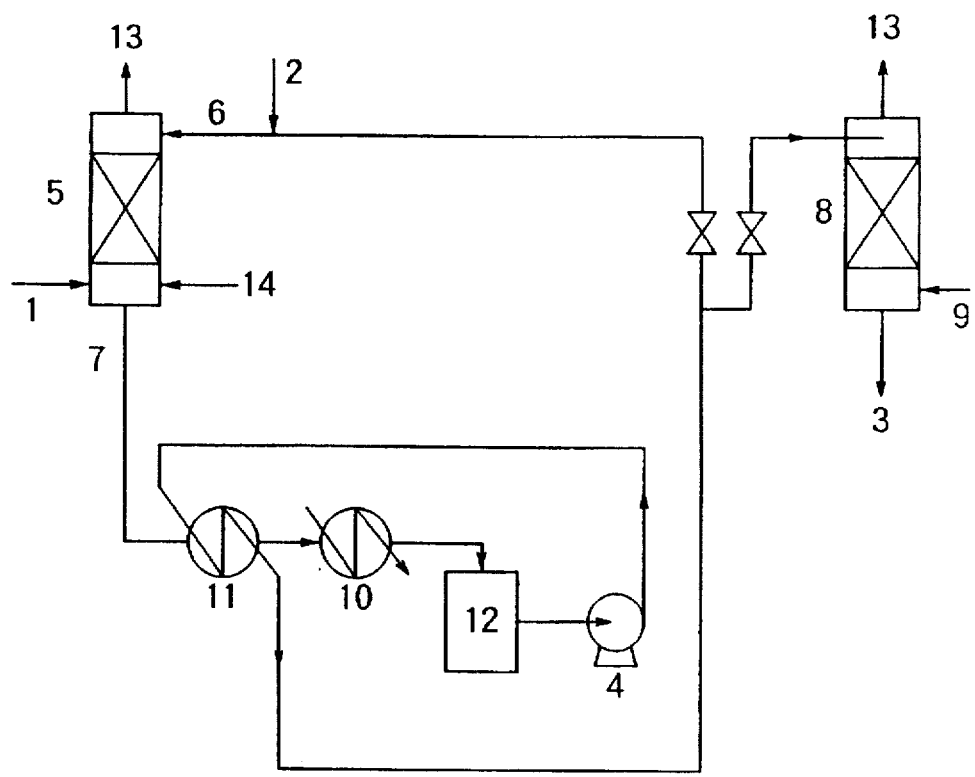
FIG. 2 is a block-type flow chart schematically showing the structure of the apparatus for producing high-purity sulfuric acid as shown in FIG. 1, which further includes a heat exchanger disposed therein.

In the present invention, it is further preferred that the temperature of the liquid to be supplied to the stripping step is 60°–180° C. (more preferably, 80°–120° C.). When the temperature of the liquid to be supplied to the stripping step is below 60° C., there can be caused an inconvenience such that the effect of the stripping in the stripping tower becomes insufficient, and sulfurous acid gas remains in the sulfuric acid as the resultant product. On the other hand, when the above temperature exceeds 120° C., the load to the heat exchanger at the inlet port of the circulating pump is liable to become too heavy. In other words, it is possible that the capacity of the heat exchanger is required to be extremely great, and the resultant (thermal) profitability becomes poor. The method of controlling the temperature of the liquid to be supplied to the stripping step within the above-mentioned range, is not particularly limited, but for example, it is possible to adopt a method wherein the sulfuric acid to be supplied to the stripping step is heated by means of steam or a heater such as those utilizing an electric heater; a method wherein the sulfuric acid (to be supplied) to the stripping step and the sulfuric acid at the outlet port of the circulating pump are subjected to a heat exchange operation (FIG. 2); etc. Particularly, the latter method using the heat a exchange operation as shown in FIG. 2 is preferred in view of the thermal profitability.

Further, the method of measuring the temperature of the sulfuric acid to be supplied to the stripping step is not particularly limited, but it is preferred to use a thermocouple-type thermometer using a well comprising Teflon (tetrafluoroethylene) or quartz glass, etc, in view of the prevention of the metal contamination.

In the transport step in the embodiment as shown in FIG. 1, at least a portion of the crude sulfuric acid is supplied to the stripping step, but the remainder portion of the crude sulfuric acid is recycled to the absorption step.

(Heat Exchanger)

The heat exchanger to be used in the production process according to the present invention (e,g., in the embodiment as shown in FIG. 2) is not particularly limited, but may be one which is appropriately be selected from those known in the art (such as heat exchangers of shell-and-tube type, double pipe-type, liquid film-type, coil-type, fin-type, etc.). Among these, the coil-type heat exchanger comprising quartz may particularly preferably be used in view of heat shock.

(Stripping Step)

The stripping step in the present invention is a step wherein, in the stripping tower (8), the crude sulfuric acid supplied from the transport step (7) is subjected to stripping by use of air (9) so as to separate and remove, from the sulfuric acid, the sulfurous acid gas which can be contained in the crude sulfuric acid, thereby to obtain high-purity sulfuric acid (3).

As the stripping tower, it is possible to use one which is the same as the absorption tower which has been described in the explanation of the above-mentioned absorption step. In this step, for example, it is possible to adopt a method wherein the sulfuric acid to be subjected to the stripping operation is supplied from an upper part of the stripping tower, air is supplied from a lower portion of the stripping tower, and both of these substances are caused to contact each other in the stripping tower.

(Other Embodiments)

Figure 3:
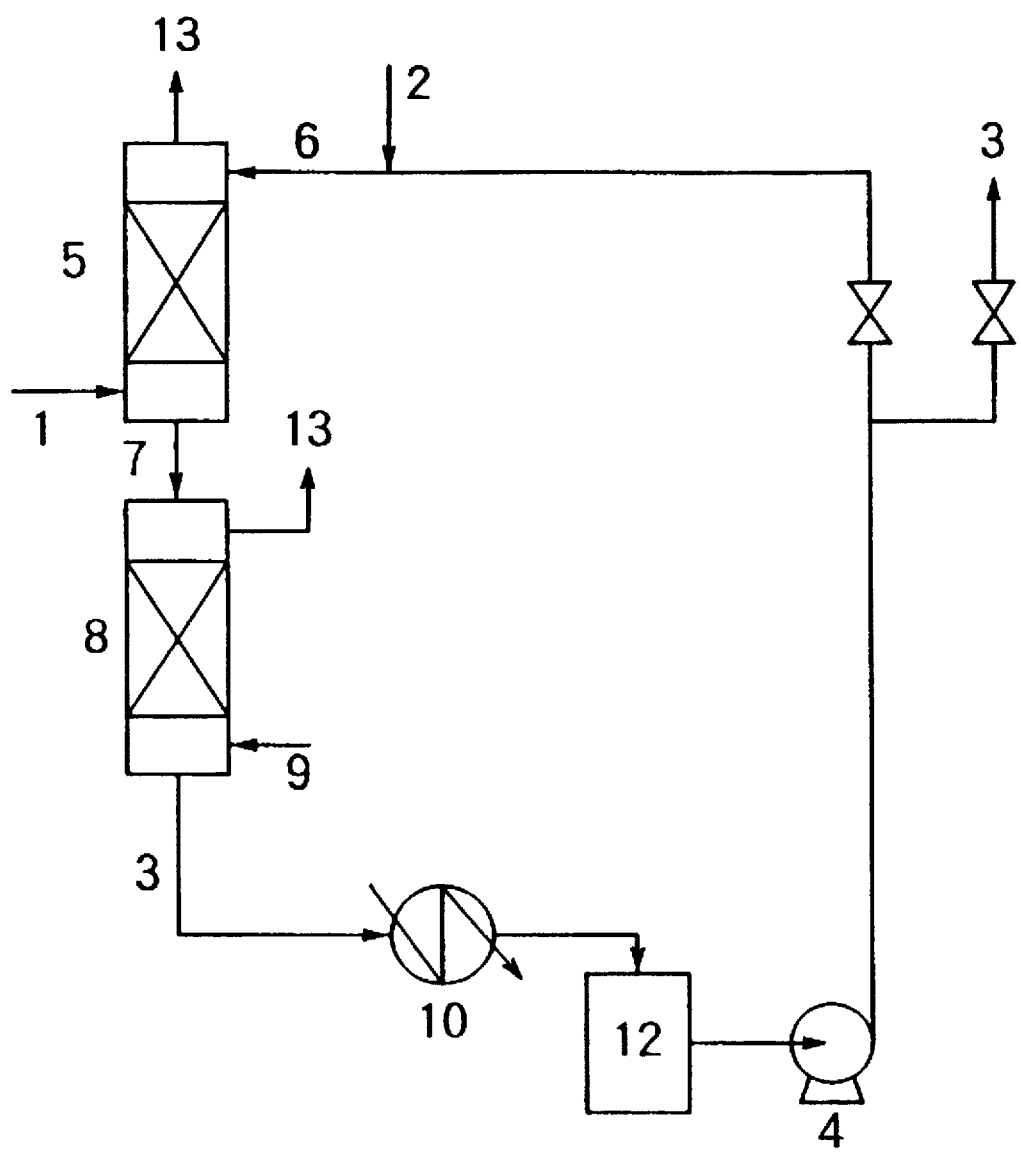
FIG. 3 is a block-type flow chart schematically showing the structure of another example of the apparatus for producing high-purity sulfuric acid, which is usable for conducting the production process according to the present invention.
Figure 4:
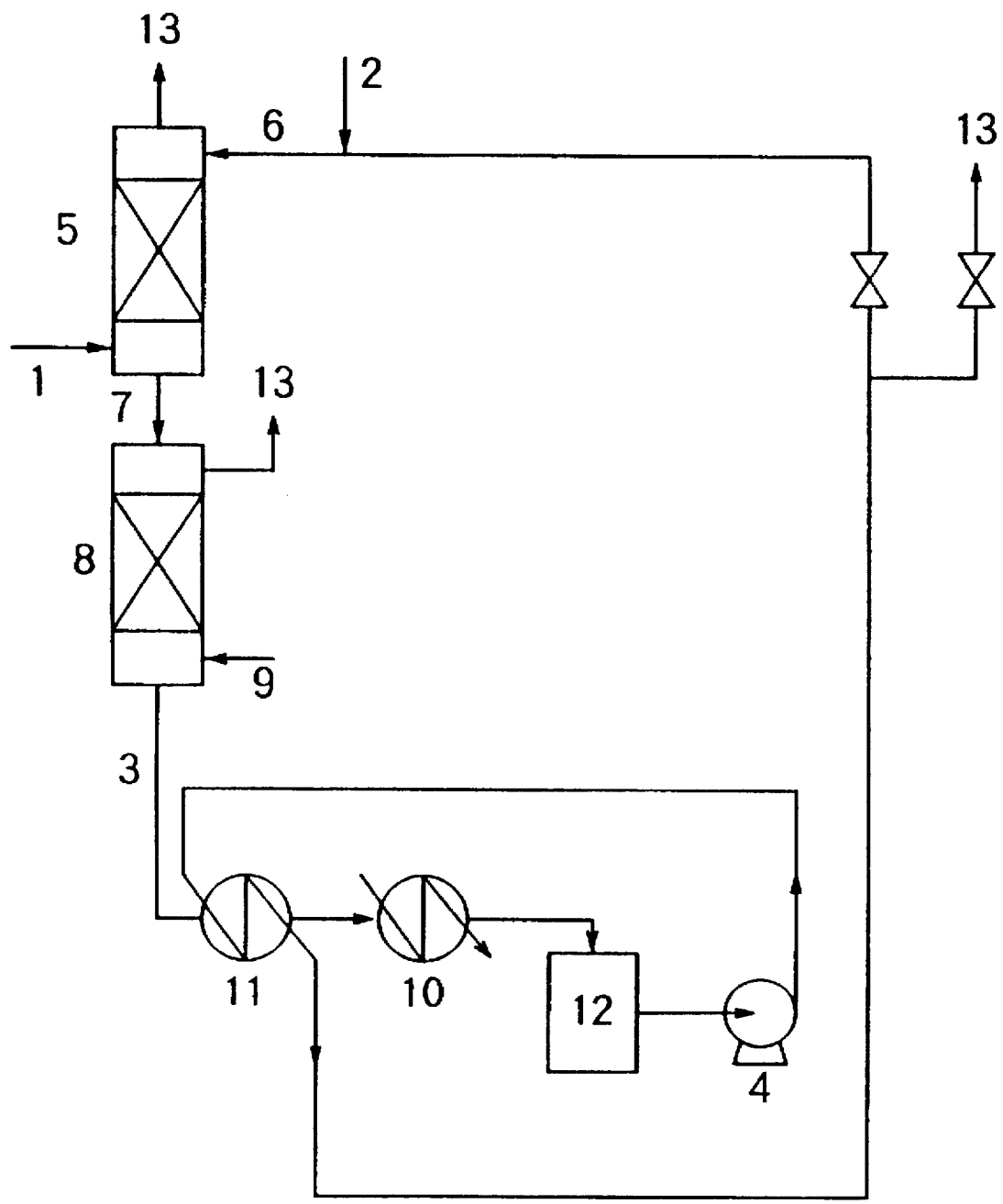
FIG. 4 is a block-type flow chart schematically showing the structure of the apparatus for producing high-purity sulfuric acid as shown in FIG. 2, which further includes a heat exchanger disposed therein.

In the present invention, as modifications or variations of the embodiments as shown in the above FIGS. 1 and 2, the stripping step and transport step may be those as shown in FIGS. 3 and 4, that is, the embodiments as described below.

Stripping step: a step wherein, in the stripping tower (8), the crude sulfuric acid (7) supplied from the absorption step is subjected to stripping by use of air (9) so as to separate and remove, from the sulfuric acid, the sulfurous acid gas which can be contained in the crude sulfuric acid, thereby to obtain high-purity sulfuric acid (3).

Transport step: a step wherein at least a portion of the high-purity sulfuric acid (3) supplied from the stripping step is separated and collected as a product sulfuric acid, and wherein the liquid is transported by means of the circulating pump (4).

The structure or constitution shown in FIGS. 3 and 4 other than those as described above is the same as those which have been described in the embodiments of FIG. 1 or 2.

(High-Purity Sulfuric Acid)

The high-purity sulfuric acid provided by the above-mentioned production process according to the present invention may be one having a metal constituent concentration of 10 wt. ppm or below, and a sulfurous acid gas concentration of 1 (one) wt. ppm or below. Such high-purity sulfuric acid can most suitably be used for a cleaning liquid for cleaning a silicon wafer, etc., in semiconductor-fabricating processes.

<EXAMPLES>

Hereinbelow, the present invention will be described in more detail with reference to specific Examples.

Example 1

The relationships between the temperature of the liquid passing through a circulating pump, and the concentration of metal constituents in the liquid were investigated by the following experiments.

Thus, 200 kg of 89 wt. %-sulfuric acid was poured into a tank comprising Teflon (capacity: 200 L). The sulfuric acid used herein was one which had been produced by causing sulfuric acid anhydride in a gaseous state ($SO_3$) to be absorbed into ultra pure water (resistivity: 18 MΩ·cm or more), and contained some metal constituents as impurities as shown in Table 1 (before circulation) appearing hereinafter.

The above impurities were analyzed by using an ICP-MS method. More specifically, a sample liquid as an analyte was formed into a minute mist state by means of a nebulizer, and then the metal elements contained in the sample liquid were ionized by using inductively coupled plasma (ICP), and the thus ionized elements were classified according to their masses by means of a mass spectrometer, thereby to determine the kinds and amounts of the respective metal elements contained in the sample liquid.

The sulfuric acid in the above-mentioned circulating tank 12 was subjected to liquid circulation at a liquid temperature of 25° C., an average flow rate of 8 L/hr for 24 hours by using a Teflon centrifugal pump. When the temperature of the sulfuric acid at the inlet port of the centrifugal pump 4 was monitored by means of a thermocouple-type thermometer including a well comprising Teflon, the temperature was found to be 25° C.

The Teflon centrifugal pump used herein was a centrifugal pump including a wetted part (liquid contact portion) of Teflon as a non-metal material. The components of the pump were made of stainless steel, but all of the wetted part thereof had been lined or coated with Teflon lining (thickness: about 3 mm). Characteristics of the Teflon centrifugal pump used herein were as follows.

Discharge rate (capacity): Q=20 L/hr
Total head: $H_r$=18 m

The high-purity sulfuric acid obtained by the above procedure was subjected to the measurement of metal constituents in the same manner as that in the case of the measurement thereof before the circulation. The thus obtained results are shown in the following Table 1.

Comparative Example 1

200 kg of 89 wt. %-sulfuric acid was subjected to liquid circulation for 24 hours in the same manner as in Example 1 except that the liquid temperature of the sulfuric acid at the inlet port of the centrifugal pump 4 was 80° C., instead of the liquid temperature of 25° C. used in Example 1. The thus obtained results are inclusively shown in the following Table 1.

TABLE 1

|  | \<Ex. 1\> | \<Comp. Ex. 1\> | \<Reference\> |
|---|---|---|---|
| Temp. of circulating sulfuric acid (°C.) | 25 | 80 | (before circulation) |
| Metal constituent (ppt) in sulfuric acid after circulation | | | |
| Aluminum | 166 | 1100 | 10 |
| Copper | 158 | 1200 | 2 |
| Magnesium | 17 | 112 | 5 |
| Iron | 254 | 2175 | 14 |

Industrial Applicability

As described hereinabove, the present invention provides a process for producing high-purity sulfuric acid, comprising: an absorption step of causing water to contact sulfuric acid anhydride in a gaseous state which may possibly contain sulfurous acid gas as an impurity, so as to cause the sulfuric acid anhydride to be absorbed into the water, thereby to provide sulfuric acid; a stripping step of subjecting the sulfuric acid to stripping by use of air, thereby to separate and remove the sulfurous acid gas in the sulfuric acid; and a transport step of subjecting at least a portion of the sulfuric acid to liquid transportation by means of a circulating pump; wherein the temperature of the liquid at the inlet port of the circulating pump is 0°–30° C.

According to the present invention, it is possible to produce high-purity sulfuric acid from which metal constituents and sulfurous acid gas as impurities have highly been removed, and which is most suitably usable for semiconductor-fabricating processes.

What is claimed is:

1. A process for producing sulfuric acid, comprising:

an absorption step of causing water to contact sulfuric acid anhydride which may contains sulfurous acid gas as an impurity, so as to cause the sulfuric acid anhydride to be absorbed into the water, thereby to provide sulfuric acid;

a stripping step of subjecting the sulfuric acid to stripping by use of air, thereby to separate and remove the sulfurous acid gas in the sulfuric acid; and a transport step of subjecting at least a portion of the sulfuric acid to liquid transportation by means of a circulating pump;

wherein the temperature of the liquid at the inlet port of the circulating pump is 0°–30° C.

2. A process for producing high-purity sulfuric acid according to claim 1, wherein the absorption step, the transport step and the stripping step are conducted in this order; and in the transport step, at least a portion of the sulfuric acid provided in the absorption step is supplied to the stripping step.

3. A process for producing high-purity sulfuric acid according to claim 1, wherein the absorption step, the stripping step, and the transport step are conducted in this order; and in the transport step, at least a portion of the sulfuric acid which has been subjected to stripping in the stripping step is separated and collected as a product of sulfuric acid.

4. A process for producing high-purity sulfuric acid according to claim 1, wherein the temperature of the liquid supplied to the stripping step is 60°–120° C.

5. A process for producing high-purity sulfuric acid according to claim 1, wherein the liquid to be supplied to the circulating pump is cooled by means of a cooler disposed at the inlet port of the circulating pump.

6. A process for producing high-purity sulfuric acid according to claim 1, wherein a heat exchange operation is conducted between the liquid at the outlet port of the circulating pump and the liquid at the inlet port of the circulating pump by means of a heat exchanger.

* * * * *